3,142,595

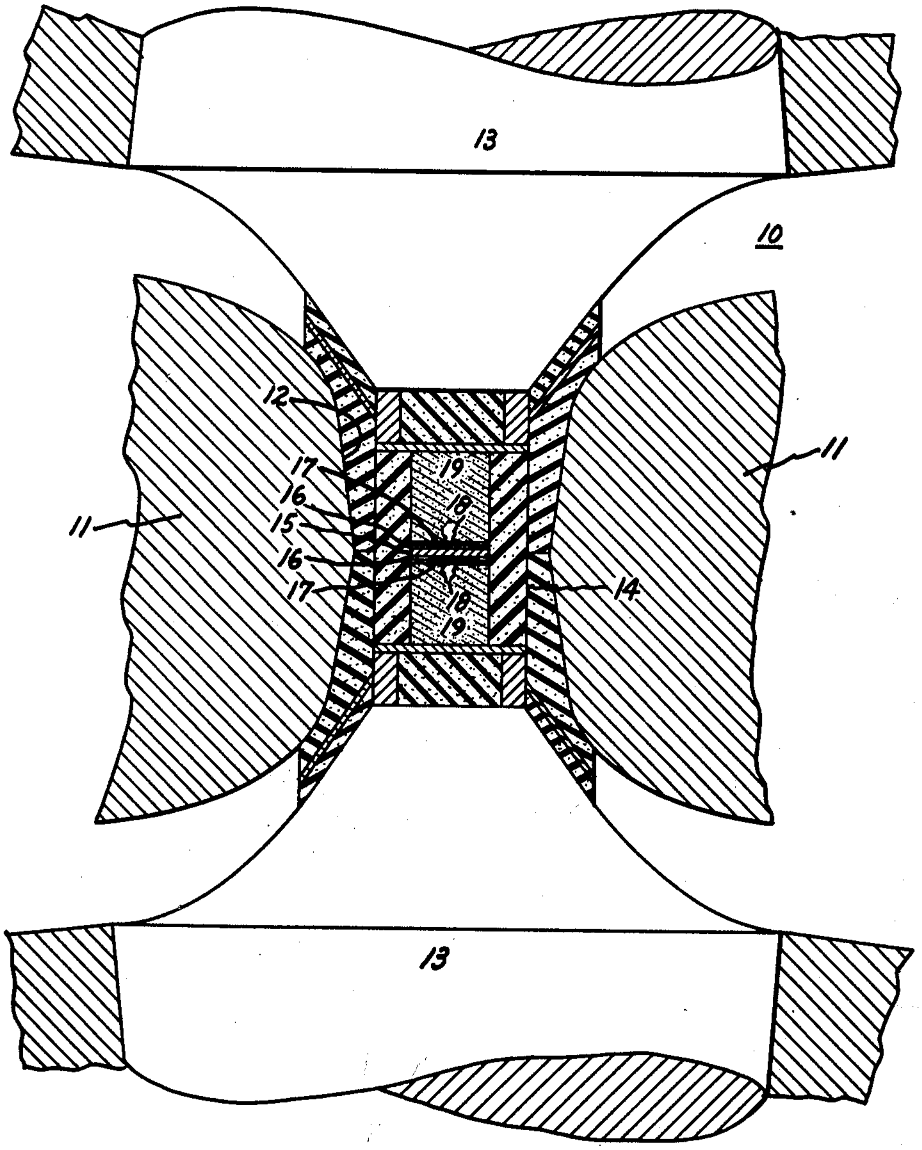
Inventor:
Robert H. Wentorf Jr.,
by James J. Lichiello
His Attorney.

BULK JUNCTIONS EMPLOYING p-TYPE DIAMOND CRYSTALS AND METHOD OF PREPARATION THEREOF

Robert H. Wentorf, Jr., Schenectady, N.Y., assignor to General Electric Company, a corporation of New York Filed Aug. 31, 1961, Ser. No. 135,333
6 Claims. (Cl. 148—171)

This invention relates to bulk electrical junctions in semiconductive diamond and cubic form of boron nitride crystal, and more particularly to a method of providing bulk p–n and p–p junctions between such crystals whereby such bulk junctions are useful semiconductor devices.

Semiconductors are electronic conductors and the electric currents in them may be carried by two types of charged particles. First, is the electron, a negatively charged particle of charge $4.80 \times 10^{-10}$ esu., and a mass of $9.11 \times 10^{-28}$ g. Semiconductors in which electrons do the charge-carrying are called n-type or excess semiconductors. Semiconductors that conduct through positive hole conduction are p-type or defect semiconductors. This particle called the hole, whose existence depends upon the quantum mechanical effects in crystals, is similar to an electron in most respects, except that it has a positive charge. It usually also has a somewhat different effective mass from the electron although of the same order of magnitude.

A p-type semiconductor and an n-type semiconductor may be suitably electrically connected in the form of a p–n junction, which is the boundary between two regions, one n-type and the other p-type. A p–n junction may act as the essential part of a rectifier, a conductivity cell or photo-voltaic cell. A rectifier, generally, is a device which permits more current to pass in one direction than in the opposite. A photoconductive cell is one whose electrical resistance varies with the light intensity, and a photo-voltaic cell is one which in itself produces an electric voltage when light is projected upon it. Two p–n junctions may also be suitably arranged to provide a transistor device.

Among the most important semiconductor phenomena and also one of the first to be ordinarily applied and practiced, is that of contact rectification. Contact rectifiers are usually of two types, the first type having relatively large, the second, relative small, changes in electrical current density through the junction. The first is defined as a point contact rectifier in which two semiconductors p–n are joined together at a point contact and, in the second, they are joined in order to have a surface or area contact. Ordinarily, in the neighborhood of point contact, the surface states and impurities have complex additional effects on electrical behavior of the junction and it is therefore preferable to have a bulk p–n junction. Such a bulk junction has an electrical behavior which has a relatively straightforward and stable dependence upon the bulk properties of the n-type and p-type materials and upon the width of the mixed zone formed by interdiffusion of the n-type, p-type materials.

As mentioned in copending application Serial No. 139,029, Wentorf, filed concurrently herewith, rectification effects may also be obtained through p–p junctions of diamond and the cubic form of boron nitride crystals. However, these junctions are of the point contact type and in many instances a bulk contact is more desirable.

Because of the well known characteristics of semiconductors generally, they are very highly desirable elements for the various electrical purposes as described. However, their use is limited, in one sense, by high temperatures which deleteriously affect their electrical properties, and they are also quite dependent upon the characteristics of the junction, i.e., bulk or point contact. A particularly desirable rectifier, for example, is one which is very durable and extremely resistant to high temperature effects.

Accordingly, it is an object of this invention to provide a high temperature semiconductor containing a bulk electrical junction incorporating p-type diamonds.

It is another object of this invention to provide a high temperature semiconductor bulk p–n junction utilizing a p-type semiconductive diamond and an n-type semiconductive form of cubic boron nitride crystal.

It is a further object of this invention to provide a bulk p–p junction between diamond crystals.

It is yet another object of this invention to provide a bulk p–n junction between a diamond crystal and a cubic form of boron nitride crystal where the diamond crystal is grown on the cubic form of boron nitride crystal in a high temperature, high pressure process.

It is yet another object of this invention to provide a bulk p–p junction between diamond crystals where a p-type diamond is grown on a p-type diamond seed in a high temperature, high pressure process.

Briefly described, this invention includes the use of a semiconductive diamond or cubic form of boron nitride crystal as a seed crystal in a high temperature, high pressure process whereby p-type semiconductive diamond is grown on the seed to provide a bulk electrical junction.

This invention will be better understood when taken in connection with the following description and the drawing.

The practice of this invention requires an apparatus capable of withstanding high pressures and high temperatures in order to provide the required growth conditions for diamond and cubic form of boron nitride. Various apparatuses are found in the prior art which are capable of providing the conditions for the particular processes involved. As an example, one preferred high temperature, high pressure apparatus is that disclosed and claimed in U.S. Patent 2,941,248, Hall. Briefly, and as illustrated in the drawing, such an apparatus 10 includes, an annular belt member 11 having a convergent divergent aperture 12 therethrough, and a pair of frusto-conical oppositely positioned and movable punches 13 which move into said opening to define a reaction chamber. In the reaction chamber, a reaction vessel 14 containing a specimen material is placed to be subjected to high pressures by motion of the punches, and to high temperatures by means of resistance heating of the material. Such a high pressure, high temperature apparatus is presently utilized in the commercial production of diamond crystals.

Diamond crystals are grown by a high temperature, high pressure process. A preferred method of producing, growing or making diamonds is adequately disclosed and claimed in U.S. Patents 2,947,610, Hall et al., and 2,947,609, Strong et al. Briefly described, the method of making diamonds includes the subjection of a non-diamond form of carbon, for example graphite, together with a catalyst to sufficiently high pressures and temperatures in the diamond forming region of the phase diagram of carbon to provide diamond growth. The catalyst is described as containing a metal, for example one of the metals of Group VIII of the Periodic Table of Elements, chromium, manganese, and tantalum.

Diamonds may also be grown as semiconductors utilizing the above-described apparatus and method of making diamond. Such a method of making semiconductive diamond is disclosed and claimed in copending application Serial No. 130,439, Wentorf et al., filed August 9, 1961, and assigned to the same assignee as the present invention. Briefly described, the method of making semiconductive diamond includes the method of making diamonds as previously described, but includes with the graphite-catalyst combination, an activator element. The activator element may be, for example boron, aluminum, beryllium, etc. The subjection of the activator-catalyst-non-diamond form of carbon combination to pressures and temperatures in the diamond stable region of the phase diagram of carbon, results in semiconductive diamond crystals of the p-type. These crystals are further described as containing foreign atoms in their crystal structure as discrete atoms therein which modify the electrical properties of the crystal.

Semiconductive diamond may also be made by a diffusion process utilizing a high pressure, high temperature process. A diffusion process is disclosed and claimed in copending applications Serial No. 135,272, Wentorf, filed concurrently herewith, and Serial No. 135,273, Cannon, filed concurrently herewith, each assigned to the same assignee as the present invention. The diffusion process of providing a semiconductive diamond crystal includes the subjection of a diamond seed crystal together with an activator material, for example boron, aluminum, etc., to high pressures and high temperatures in order that atoms of the activator material diffuse into the diamond crystal to provide p-type diamond.

The cubic form of boron nitride may also be produced by a high pressure, high temperature process including the high pressure apparatus above described. The method of making the cubic form of boron nitride is adequately disclosed and claimed in U.S. Patent 2,947,617, Wentorf. Briefly described, the method of making a cubic form of boron nitride comprises, for example, subjecting to a temperature of about 1200° C. and a pressure of about 50,000 atmospheres, a mixture of ingredients comprising at least one catalyst metal selected from the class consisting of alkali metals, alkali earth metals, lead, antimony, tin, and nitrides of the foregoing metals, and a source of boron selected from the class consisting of element boron, hexagonal boron nitride, and compounds of boron decomposable to elemental boron at the elevated temperatures and pressures, and a source of nitrogen selected from the class consisting of hexagonal boron nitride and nitrogen-containing compounds of the aforesaid catalyst materials which provide a source of nitrogen under the temperatures and pressures used for effecting formation of the cubic crystal structure boron nitride.

A method of making semiconductive crystals of the cubic form of boron nitride is adequately disclosed and claimed in copending applications Serial Nos. 53,225, 111,279, 122,273, and 2,978, Wentorf, filed August 31, 1960, May 19, 1961, July 10, 1961, and January 18, 1960, respectively, and assigned to the same assignee as the present invention. The process for providing the semiconductive cubic form of boron nitride crystal generally includes the method of making or growing a crystal of the cubic form of boron nitride from the reactive material. More specifically, the process also includes the addition of an activator material in the reaction vessel, such as for example silicon, melamine, selenium, sulfur, etc., which during the high temperature, high pressure process introduces the respective atoms in a crystal of the cubic form of boron nitride to provide a semiconductive crystal of the n-type. Use of beryllium as an activator provides a crystal of p-type.

It has been discovered that a bulk p–n junction between a semiconductive diamond crystal and a semiconductive crystal of the cubic form of boron nitride may be provided by a growth process incorporating these two crystals. The method of so providing a bulk p–n junction includes utilizing a semiconductive crystal of cubic form of boron nitride as produced by the method above described, as a seed crystal. The seed crystal is utilized in a diamond growth process by being placed in or subjected to high pressure, high temperature conditions of a diamond making process while in the presence of a non-diamond form of carbon, a catalyst, and an activator material, so that the process provides a growth of a semiconductive diamond on and/or around the semiconductive seed crystal. Ordinarily, a crystal of the cubic form of boron nitride is much more stable than diamond at higher temperatures in the range of 1000–2000° C. Accordingly, a cubic form of boron nitride crystal may be utilized as a seed crystal in a diamond growing process, because at the elevated pressure and temperature conditions necessary for growing diamonds the cubic form of boron nitride crystal remains stable. Thus, the diamond making process may be carried on in a high pressure, high temperature reaction cell in which a seed crystal of the cubic form of boron nitride is placed, and the resulting diamond is grown on the cubic form of boron nitride crystal. Such a composite crystal therefore includes an n-type cubic form of boron nitride crystal and a p-type diamond crystal with a bulk p–n junction.

Specific operative examples of this invention are as follows: In Example 1, n-type cubic form of boron nitride crystals are prepared as described in aforementioned application Serial No. 122,773. In Examples 2 and 3, these exemplary n-type cubic form of boron nitride crystals are utilized as seed crystals in a diamond growing process. In all examples measuring voltages were 4 to 6 volts.

*Example 1*

Lithium nitride and hexagonal boron nitride were mixed together in a ratio of 1.7 parts by weight of hexagonal boron nitride and 0.425 part of lithium nitride catalyst. To this mixture there was added 0.1 part of selenium all materials being in the finely divided state. The mixture of ingredients was then placed in a reaction vessel and subjected to a pressure of about 77,000 atmospheres and a maximum temperature of about 2100° C. for a period of time of about 30 minutes. Thereafter, these conditions were removed and crystals of cubic boron nitride were separated from the hexagonal material both manually and by using a standard filtration technique in which the mixture was added to bromoform in which the hexagonal boron nitride would float and the boron nitride sink.

By the usual procedure, the electrical conductivity was established by the standard probe technique utilizing silver electrodes and at room temperature, and semiconducting properties established by thermoelectric power measurements. These crystals were found to be n-type semiconductors. The process of Example 1 is equally carried out over a wide range of pressures and temperatures and mixtures, including the addition of the aforementioned additives in the range of about .001 to as high as 10 percent and more by weight of the starting boron nitride. Pressures may be of the order of 40,000 atmospheres and greater and temperatures on the order of about 1200° C. and higher to 2200° C.

*Example 2*

Exemplary crystals taken from the above Example 1 were blocky in shape with an electrical conductivity of about $5\times10^5$ ohms and a size of about 0.2 mm. Such crystals were then placed in the reaction vessel of the drawing and embedded in the reaction vessel in a mixture of graphite, a catalyst metal and an activator material. More particularly, about 0.1 gram of catalyst metal iron, in the form of a short solid cylinder 15 of 0.120 inch in diameter and .045 inch long, was placed in the center, as illustrated, of reaction vessel 14. About .002 gram of boron carbide powder 16 was placed at each end of the iron cylinder and held in place by tantalum discs 17, 0.010 inch thick and 0.120 inch in diameter. At each end of this composite cylinder there were placed first, a seed crystal 18 of n-type cubic boron nitride and then a rod of spectroscopic carbon 19 of 0.120 inch in diameter and 0.20 inch long. Current flow through the contents provides electrical resistance heating in the usual manner. The sample was subjected to pressures of the order of 60,000 atmospheres and temperatures of the order of 1600° C. for about 10 minutes, thereby causing those portions of the carbon rods near the cubic boron nitride to be converted to p-type diamond. These reaction conditions were then removed and there was recovered from the reaction vessel the original seed crystals of the cubic form of boron nitride with a crystalline growth of diamond on their surface. An examination of this combination indicated a conforming growth of diamond crystal of p-type. Utilizing this combination crystal as a bulk p–n junction between a pair of heavy silver electrodes, it was found that the flow of current in the direction corresponding to the diamond being positive was larger than the flow of current in the reverse direction.

*Example 3*

The procedures of Example 2 was repeated except that parts of the tantalum discs 18 were cut away so as to permit the carbon 19 to contact the iron cylinder 15 and boron carbide 16 directly, and several crystals of n-type cubic boron nitride were placed at each carbon-metal interface. The assembly was subjected to a pressure of about 60,000 atmospheres and a temperature of about 1600° C. for about 10 minutes. Again there was obtained growth of p-type diamond around and on the cubic boron nitride seed crystals. The masses of mixed crystals were carefully broken up so as to separate, for testing, several combination crystals, each containing at least one p–n junction. When such a combination crystal was utilized as a bulk p–n junction between a pair of heavy silver electrodes, it was found that the flow of current was larger when the diamond portion of the composite crystal was positive, and smaller when the diamond portion of the composite crystal was negative.

The following examples are representative of bulk p–p junctions between crystals of p-type cubic form of boron nitride and diamond:

*Example 4*

The sample configuration used in Example 2 was again employed, except that the iron cylinder was replaced by one of nickel-iron alloy containing 35% nickel, by weight. At each carbon metal interface there was placed 3 or 4 crystals of p-type semiconducting cubic boron nitride made by the process employing beryllium which was disclosed in the above-mentioned copending application Serial No. 2,978, Wentorf. After a 14-minute exposure to a pressure of 54,000 atmospheres and a temperature of about 1400° C., masses of semiconducting diamond crystals were found to have grown on and around the crystals of cubic boron nitride. After cleaning in mixtures of sulfuric, nitric, hydrochloric and hydrofluoric acids to remove traces of graphite and metal, some of the composite crystals were tested for rectification effects. It was found that the current passed through such a composite crystal was 2 to 10 times greater when the diamond portion of the composite was negative than when the diamond was positive. Typical currents employed were in the range of 1 to 20 micro-amperes.

*Example 5*

The sample configuration used in Example 2 was again employed, except that the tantalum discs were replaced by an equivalent volume of 50 mesh aluminum powder. At each carbon-metal interface there were placed 3 or 4 crystals of p-type semiconducting cubic boron nitride made by the process of the above-mentioned copending application Serial No. 2,978, Wentorf. After a 7-minute exposure to a pressure of about 66,000 atmospheres and a temperature of about 1800° C., masses of semiconducting diamond crystals were found to have grown on and around the crystals of cubic boron nitride. After cleaning in hot mixtures of sulfuric, nitric, and hydrochloric acids to remove traces of graphite and metal, some of the composite crystals were tested for rectification effects. It was found that the current passed through such a composite crystal was from 2 to 4 times greater when the diamond portion of the composite was positive than when the diamond was negative. Typical currents employed were in the range of 2 to 60 micro-amperes.

The teaching of this invention are equally applicable to providing diamond growth on a diamond seed crystal. Thus, a bulk p–p junction is obtained by growing p-type diamond on a p-type diamond seed. It is preferred, however, that the activator material be different for the new growth. For example, a diamond seed of the p-type, where aluminum has been employed to provide the p-type semiconductivity, is effectively employed for new diamond growth employing boron as the activator. Accordingly, the practices of the preceding examples may be applied to produce bulk p–p junctions in diamond. A specific example is as follows:

*Example 6*

The sample configuration of Example 2 was again employed except that the cubic boron nitride crystals were replaced by crystals of p-type, aluminum-doped diamond prepared by the process described in the aforementioned copending application Serial No. 130,439, and the short iron cylinder was replaced by a composite cylinder made of alternate discs of iron and nickel each about 0.010 inch thick. This sample was subjected to a pressure of about 59,000 atmospheres and a temperature of about 1550° C. for a period of 9 minutes. After reduction of temperature and pressure to room values, the sample was cleaned in various hot mixtures of sulfuric, nitric, hydrochloric and hydrofluoric acids. It was found that several diamond crystals of a dark blue color, identified as p-type by separate tests, had grown onto and around the nearly colorless diamond seed crystals. When an electrical current was passed through such a composite crystal via steel and copper probes, it was observed that the current was about 2 times larger when the aluminum-doped diamond portion of the composite was negative than when the aluminum-doped diamond portion was positive. Typical currents were in the range of 2 to 40 micro-amperes. Thus, such a composite crystal made of two different kinds of p-type diamond shows electrical rectification effects.

Representative examples of both p and n-type cubic form of boron nitride crystals with the several activator elements, together with p-type diamond crystals also with several activator elements, all indicate rectifying effects.

The diffusion of impurities into an already formed crystal of diamond or borazon proceeds slowly and irregularly because of the relative close atomic spacings of these crystals so that there are only limited effects of any diffusion in this process. Resulting crystals may also be split or cut into fragments to produce fragments containing p–n junctions and n–p–n junctions and p–n–p junctions etc., depending upon the number and sequence of the growing steps and the method of dividing resulting crystals. The different colors exhibited by crystals of different types, for example blue diamonds of p-type and yellow boron nitride crystals of the n-type, facilitates such a division of crystals into appropriate fragments. Because it is possible to control the growth and solution of seed crystals, it is also possible to form junctions which would be essentially bulk junctions. Also, extremely sharp junctions are formed because the diffusion rates of impurities in these crystals are relatively low, i.e., because diamond or borazon crystals are formed out of solutions at temperatures far below their melting temperatures and because the pressures are high.

It is obvious that a junction as described may be a joined or fused type of junction between a pair of prior formed semiconductive crystals and it is intended to include by "fusing" other solid type or fixed connection.

The cubic form of boron nitride crystal not only may be of n or p-type, but also may be produced or made semiconductive by various activator elements.

By the same token, it is obvious to those skilled in the art that the junction may be attained by the diffusion process. As in any of the preceding examples, the diamond growth may be of the nonconducting variety. Thereafter, the diffusion process as before mentioned with respect to copending applications Serial No. 135,272, Wentorf, and Serial No. 135,273, Cannon, may be utilized to diffuse boron, and aluminum, etc., into the diamond growth for p-type diamond. A diamond seed made semiconductive by the diffusion process may also be employed in accordance to the teachings of this invention.

There is thus provided by the teachings of this invention p–p and p–n type semiconductor bulk junctions with p-type diamond joined to p or n-type cubic form of boron nitride or p-type diamond. The term "bulk" junction is employed to include the term as utilized in the art, and may be described as a junction through which current density does not markedly change in contrast to "point contact junctions" as this latter term is used in the art.

While a specific method and apparatus in accordance with this invention has been shown and described, it is not desired that the invention be limited to the particular description nor to the particular configurations illustrated, and it is intended by the appended claims to cover all modifications within the spirit and scope of this invention.

What I claim as new and desire to secure by Letters Patent of the United States is:

1. A bulk electrical junction comprising a p-type diamond and a semiconductive crystal taken from the class consisting of diamond and cubic form of boron nitride crystals, said cubic boron nitride crystals having atoms of an activator material in their crystal structure which modify and increase their electrical properties, said cubic boron nitride crystals having a specific resistance of less than about $1\times10^{10}$ ohm-centimeters.

2. The invention as recited in claim 1 wherein the said semiconductive crystal from said class is p-type diamond.

3. The invention as recited in claim 1 wherein the said semiconductive crystal from said class is p-type cubic form of boron nitride having a specific resistance of less than about $1\times10^{10}$ ohm-centimeters.

4. The invention as recited in claim 1 wherein said semiconductive crystal from said class is n-type cubic form of boron nitride having a specific resistance of less than about $1\times10^{10}$ ohm-centimeters.

5. A method of providing a bulk electrical junction between a diamond and a crystal taken from the class consisting of diamond and cubic form of boron nitride crystals having increased electrically semiconductive properties which comprises, utilizing one of said crystals from said class as a seed crystal in a reaction chamber, placing a non-diamond form of carbon, an activator material, and a diamond growth catalyst in said reaction chamber and subjecting the combination of seed, carbon, activator material and catalyst to elevated pressures and temperatures in the diamond stable region of the pressure temperature phase diagram of carbon where the catalyst effects the conversion of the non-diamond form of carbon to diamond so that diamond grows on said seed, said diamond growth having discrete atoms of said activator material incorporated in its crystal structure to increase its electrically conductivity properties.

6. A method of providing a bulk electrical junction between a diamond and a crystal taken from the class consisting of diamond and cubic form of boron nitride crystals having altered and increased electrically semiconductive properties which comprises, utilizing one of said crystals from said class as a seed crystal in a reaction chamber, placing a non-diamond form of carbon and a diamond growth catalyst in said reaction chamber subjecting the said combination of seed, carbon, and catalyst to elevated pressures and temperatures in the diamond stable region of the pressure temperature phase diagram of carbon where the catalyst effects the conversion of the non-diamond form of carbon to diamond so that diamond growth occurs on said seed, and thereafter diffusing atoms of an activator material into said diamond growth so as to cause said diamond growth to have increased electrical conductivity properties because of atoms of said activator material being included in the crystal structure of said diamond growth.

References Cited in the file of this patent

UNITED STATES PATENTS

| | | |
|---|---|---|
| 2,915,647 | Ebers et al. | Dec. 1, 1959 |
| 2,947,609 | Strong | Aug. 2, 1960 |
| 2,947,617 | Wentorf | Aug. 2, 1960 |
| 2,975,085 | Hunter | Mar. 14, 1961 |

OTHER REFERENCES

De Jong: "General Crystallography—A Brief Compendium," W. H. Freedman and Co., San Francisco, 1959, p. 149.

Anderson: "Germanium-Gallium Arsenide Heterojunctions," I.B.M. Journal of Research and Development, vol. 14, No. 3, July 1960, pp. 283–287.